US010261750B2

(12) United States Patent
Lindahl (10) Patent No.: US 10,261,750 B2
(45) Date of Patent: *Apr. 16, 2019

(54) USING A PROCESSING DEVICE AS A DOCK FOR A MEDIA PLAYER

(71) Applicant: Apple Inc., Cupertino, CA (US)

(72) Inventor: Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,951

(22) Filed: Apr. 19, 2018

(65) Prior Publication Data

US 2018/0336004 A1    Nov. 22, 2018

Related U.S. Application Data

(63) Continuation of application No. 14/939,891, filed on Nov. 12, 2015, now Pat. No. 9,965,241, which is a continuation of application No. 12/790,623, filed on May 28, 2010, now Pat. No. 9,213,391.

(51) Int. Cl.
| | |
|---|---|
| G06F 13/00 | (2006.01) |
| G06F 3/16 | (2006.01) |
| G06F 1/3215 | (2019.01) |
| H02J 7/00 | (2006.01) |
| G05B 15/02 | (2006.01) |
| G06F 1/26 | (2006.01) |

(52) U.S. Cl.
CPC ............ *G06F 3/165* (2013.01); *G05B 15/02* (2013.01); *G06F 1/263* (2013.01); *G06F 1/3215* (2013.01); *H02J 7/0004* (2013.01); *H02J 7/0054* (2013.01)

(58) Field of Classification Search
CPC .. G06F 13/302–13/318; G06F 13/4022; G06F 13/597
USPC ......................................... 710/305–306, 100
See application file for complete search history.

(56) References Cited

U.S. PATENT DOCUMENTS

| | | | |
|---|---|---|---|
| 6,810,274 B2 | 10/2004 | Sawada et al. | |
| 6,859,287 B1 | 2/2005 | Frederiksen et al. | |
| 7,492,890 B2 | 2/2009 | Mllani | |
| 7,669,070 B2 | 2/2010 | Asmi et al. | |
| 7,835,809 B2 | 11/2010 | Griffin, Jr. | |
| 2004/0224638 A1 | 11/2004 | Fadell et al. | |
| 2006/0212637 A1 | 9/2006 | Lo et al. | |
| 2007/0026799 A1 | 2/2007 | Wang et al. | |
| 2007/0077784 A1 | 4/2007 | Kalayjian et al. | |
| 2007/0239849 A1 | 10/2007 | Robbin et al. | |

(Continued)

FOREIGN PATENT DOCUMENTS

| | | |
|---|---|---|
| KR | 1020080035415 A | 4/2008 |
| WO | WO 2006130115 A1 | 12/2006 |

*Primary Examiner* — Tim T Vo
*Assistant Examiner* — Kim T Huynh
(74) *Attorney, Agent, or Firm* — Womble Bond Dickinson (US) LLP (57) ABSTRACT

By integrating multiple electronic devices, it is possible to increase the functionality of the devices individually. For example it is possible to improve media playback functionality, create media playlists "on-the-go" and to use a first device power supply to charge the power supply of the second device. By integrating the devices, it is possible to address some of the shortcomings of devices that are decreasing in size with increasing power requirements, while still maintaining the advantages that these devices offer.

40 Claims, 4 Drawing Sheets

(56) References Cited

U.S. PATENT DOCUMENTS

| | | |
|---|---|---|
| 2008/0005440 A1 | 1/2008 | Li et al. |
| 2010/0060549 A1* | 3/2010 | Tsern .................. G06F 3/1415 |
| | | 345/2.1 |
| 2010/0217912 A1 | 8/2010 | Rofougaran |
| 2010/0315210 A1 | 12/2010 | Travis et al. |

* cited by examiner

USING A PROCESSING DEVICE AS A DOCK FOR A MEDIA PLAYER

This application is a continuation of co-pending U.S. patent application Ser. No. 14/939,891 filed Nov. 12, 2015, which is a continuation of U.S. patent application Ser. No. 12/790,623, filed on May 28, 2010, now issued as U.S. Pat. No. 9,213,391.

BACKGROUND

Today, many popular electronic devices, such as handheld media players or portable electronic devices ("PEDs"), are battery powered and include various user interface components. Conventionally, such electronic devices include buttons, dials, or touchpads to control the media devices and to allow users to navigate through media assets, including, for example, music, speech, or other audio, movies, photographs, interactive art, text, and media resident on (or accessible through) the media devices, to select media assets to be played or displayed, and/or to set user preferences for use by the media devices. The functionality supported by such electronic devices is increasing even as these media devices continue to get smaller and more portable. Consequently, as such devices get smaller while supporting robust functionality, there are increasing difficulties in providing adequate user interfaces for the portable electronic devices.

Further, as users continue to rely more heavily on these devices for running media applications, battery life and reliability become increasingly important. As devices become smaller and more portable, however, battery size and capacity often also decreases, sometimes leaving users unable to use their media devices as often as they would like to.

Additionally, different portable electronic devices may include different interfaces and functional capabilities, and smaller devices do not always include the full functionality that their larger counterparts may offer. For example, while a smaller device may be more portable and lightweight than its larger counterpart, it may not have circuitry available capable of adjusting media playlists or creating new media playlists "on-the go", while a larger and more complex device might have these and other capabilities not associated with the smaller device.

Systems and methods in accordance with the disclosed subject matter integrate multiple electronic devices to increase the functionality of these devices individually and to address the previously mentioned issues. The disclosed subject matter includes systems and methods that take advantage of the capabilities of individual electronic devices and among other things, address the battery life, interface and interactivity issues discussed above.

SUMMARY

An electronic device can be coupled to another electronic device. The first electronic device can act a processor device, and the second electronic device can act as a media player device. After the devices are coupled, the user interface of the processor device can be used to control media playback on the media player device. Additionally, the power supply of the processor device can be used to charge the power supply of the media player device, even while the power supply of the media player device is being used to control media playback using circuitry on the media player device. The processor device can also be used to create and edit media playlists which can then be stored on the media player device.

To control media playback, the processor device can receive metadata associated with media stored on the media player device and identify information related to this media. The processor device can then open a user interface that a user can interact with, using it to control various aspects of media playback, such as playback volume and playback order.

In some embodiments, the processor device can be used to create or generate media playlists for the media player device. For example, after reading metadata received from the media player device, the processing device can display a list of media stored on the second device, and a user can use a media player user interface to select specific media to be played. The list can also be sent back to the media player and saved there for future use. A user is not limited to generating a single playlist, but can chose to generate multiple playlists of various lengths, if he so chooses, which can all be stored on the media player device.

In some embodiments, the power supply of the processor device can be used to charge the power supply of the media player device, even while the power supply of the media player device is being used to control media playback using circuitry on the media player device itself. If the user wishes, in certain embodiments, the media player device can be unplugged from the processor device and continue operating, effectively treating the processor device similar to a portable power supply charger.

BRIEF DESCRIPTION OF THE DRAWINGS

The above and other features of the presently disclosed subject matter, its nature and various advantages will be more apparent upon consideration of the following detailed description, taken in conjunction with the accompanying drawings in which.

DETAILED DESCRIPTION

In accordance with the present disclosure, an electronic device can be operative to generate or receive data. The data can include, for example, text, numbers, spreadsheets, presentations, images, audio, video, or combinations of these. For example, the data can include media stored or accessed by the device. Media can include, for example: images, photographs, video, voice or audio recordings, text (e.g., blogging or micro-blogging streams), location streams, or combinations of these.

Moreover, an electronic device in accordance with various described embodiments can capture, purchase, and access media. It may do so via a physical or wireless connection to a network or to another electronic device.

Use of this media can be dependent on the circuitry available on the media player and its capabilities. A smaller media player smaller may have a smaller power supply and smaller display. A larger electronic device may have a larger display and a larger power supply. In accordance with the present disclosure, a first electronic device can be used to control a second electronic device or to add functionality that the second device might not have without access to resources from the first device.

Figure 1:
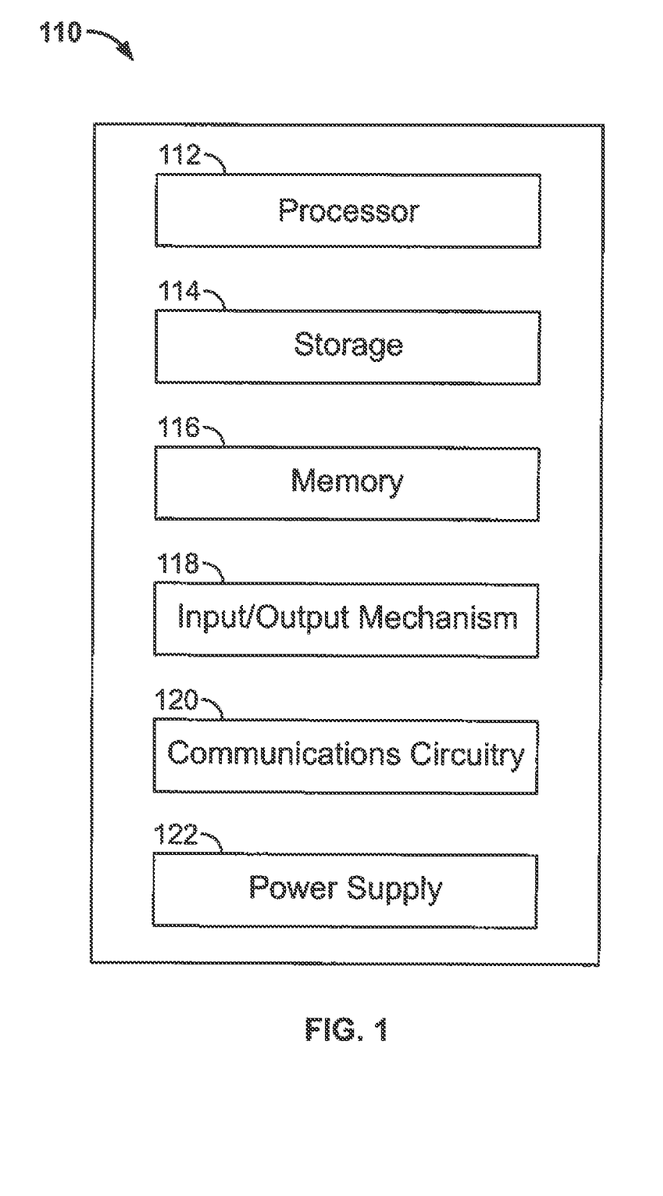
FIG. 1 is a schematic view of an illustrative electronic device that can be used as part of a system for controlling electronic media in accordance with one embodiment of the disclosed subject matter.

An electronic device used as part of the disclosed systems and methods can perform some or all of the features described above and can include any suitable combination of hardware, firmware and software for performing media transactions FIG. 1 is a schematic view of an illustrative electronic device that can be used as part of a system for controlling electronic media in accordance with one embodiment of the disclosed subject matter. Electronic device 110 can include any suitable type of electronic device operative to process media items. For example, electronic device 110 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a desktop computer, a music recorder, a video recorder, a camera, radios, medical equipment, and any other device capable of playing back media items.

Electronic device 110 may include processor 112, storage 114, memory 116, input/output interface 118, communications circuitry 120 and power supply 122. In some embodiments, one or more components of electronic device 110 may be combined or omitted (e.g., combine storage 114 and memory 116). In some embodiments, electronic device 110 may include other components not combined or included in those shown in FIG. 1 (e.g., location circuitry, sensing circuitry detecting the device environment or a bus), or several instances of the components shown in FIG. 1. For the sake of simplicity, only one of each of the components is shown in FIG. 1.

Processor 112 may include any processing circuitry or control circuitry operative to control the operations and performance of electronic device 110. For example, processor 112 may be used to run operating system applications, firmware applications, media playback applications, media editing applications, or any other application. In some embodiments, a processor may drive a display and process inputs received from a user interface.

Storage 114 may include, for example, one or more storage mediums including a hard-drive, solid state drive, flash memory, permanent memory such as ROM, any other suitable type of storage component, or any combination thereof. Storage 114 may store, for example, media data (e.g., music and video files), application data (e.g., for implementing functions on device 110), firmware, user preference information (e.g., media playback preferences), authentication information (e.g. libraries of data associated with authorized users), lifestyle information (e.g., food preferences), exercise information (e.g., information obtained by exercise monitoring equipment), transaction information (e.g., information such as credit card information), wireless connection information (e.g., information that may enable electronic device 110 to establish a wireless connection), subscription information (e.g., information that keeps track of podcasts or television shows or other media a user subscribes to), contact information (e.g., telephone numbers and email addresses), calendar information, and any other suitable data or any combination thereof.

Memory 116 can include cache memory, semi-permanent memory such as RAM, and/or one or more different types of memory used for temporarily storing data. In some embodiments, memory 116 can also be used for storing data used to operate electronic device applications, or any other type of data that, may be stored in storage 114. In some embodiments, memory 116 and storage 114 may be combined as a single storage medium.

Input/output interface 118 may provide inputs to input/output circuitry of the electronic device. Input/output interface 118 may include any suitable input interface, such as for example, a button, keypad, dial, a click wheel, or a touch screen. In some embodiments, electronic device 110 may include a capacitive sensing mechanism, or a multi-touch capacitive sensing mechanism. In some embodiments, input interface can include a microphone or other audio input interface for receiving a user's voice inputs. The input interface can include an analog to digital converter for converting received analog signals corresponding to a voice input to a digital, signal that can be processed and analyzed to identify specific words or instructions.

In some embodiments, input/output interface 118 can instead or in addition include one or more interfaces for providing an audio output, visual output, or other type of output (e.g., odor, taste or haptic output). For example, input/output interface 118 can include one or more speakers (e.g., mono or stereo speakers) built into electronic device 110, or an audio connector (e.g., an audio jack or an appropriate Bluetooth connection) operative to be coupled to an audio output mechanism. Input/output interface 118 may be operative to provide audio data using a wired or wireless connection to a headset, headphones or earbuds. As another example, input/output interface 118 can include display circuitry (e.g., a screen or projection system) for providing a display visible to the user. The display can include a screen (e.g., an LCD screen) that is incorporated in electronic device 110, a movable display or a projecting system for providing a display of content on a surface remote from electronic device 110 (e.g., a video projector), or any other suitable display. Input/output interface 118 can interface with the input/output circuitry (not shown) to provide outputs to a user of the device.

Communications circuitry 120 can be operative to create or connect to a communications network. Communications circuitry 120 can be capable of providing wireless communications using any suitable short-range or long-range communications protocol. For example, communications circuitry 120 can support Wi-Fi (e.g., a 502.11 protocol), Bluetooth (registered trademark), radio frequency systems (e.g., 1200 MHz, 2.4 GHz, and 5.6 GHz communication systems), infrared, protocols used by wireless and cellular phones and personal email devices, or any other protocol supporting wireless communications. Communications circuitry 120 may instead or in addition be capable of providing wired communications, for example using any suitable port on one or both of the devices (e.g., 30-pin, USB, FireWire, Serial, or Ethernet).

Power supply 122 can include any suitable circuitry for receiving and/or generating power, and for providing such power to one or more components of electronic device 110. In some embodiments, power supply 122 can be coupled to a power grid (e.g., when device 110 is not acting as a portable device or when a power supply of the device is being charged at an electrical outlet with power generated by an electrical power plant). As another example, power supply 122 can be configured to generate power from a natural source (e.g., solar power using solar cells). In some embodiments, power supply 122 can include one or more batteries for providing power (e.g., when device 110 is acting as a portable device). For example, power supply 122 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise).

The power can be provided by power supply 122 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 122 can be operative to request or provide particular amounts of power at different times, for example, based on the needs or requirements of electronic device 110 or periphery devices that may be coupled to electronic device 110 (e.g., to request more power when charging a battery than when the battery is already charged).

In some embodiments, electronic device 110 may include a bus operative to provide a data transfer path for transferring data to, from, or between control processor 112, storage 114, memory 116, input/output interface 118, communications circuitry 120, and any other component included in the electronic device.

Figure 2:
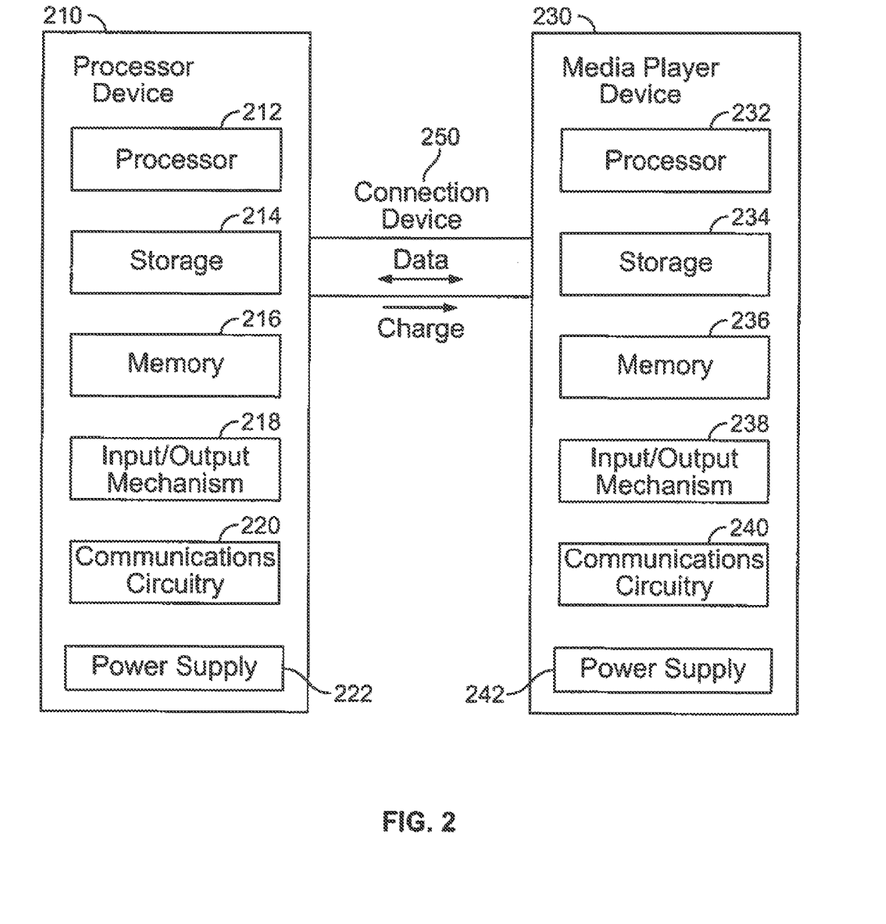
FIG. 2 is a schematic view of an illustrative electronic system for controlling electronic media in accordance with one embodiment of the disclosed subject matter.

FIG. 2 is a schematic view of an illustrative electronic system for controlling electronic media in accordance with one embodiment of the disclosed subject matter. System 200 may contain elements 210, 230 and 250. Element 210 is an electronic device that can act as an electronic processor device. Element 210 may be substantially similar to element 110 of FIG. 1 and the previous description of the element 110 can be applied to element 210. Element 210 may include processor 212, storage 214, memory 216, input/output interface 218, communications circuitry 220 and power supply 222. Element 230 is a second electronic device. Element 230 can act as a media player device and may be substantially similar to element 110 of FIG. 1, and the previous description of element 110 can be applied to element 230. In certain embodiments in accordance with the disclosed subject matter, element 230 may include processor 232, storage 234, memory 236, communications circuitry 240 and power supply 242. Input/output interface 238 may be optional in certain embodiments in accordance with the disclosed subject matter. Element 250 is a coupling device that can be used to couple elements 210 and 230. Coupling device 250 can take a number of forms (e.g., a USE cable, a FireWire cable, or via audio input/output jacks) and may be connected to communications circuitry 220 and 240. In certain embodiments, the devices can be connected wirelessly. The two electronic devices 210 and 230 can use coupling device 250 to send information such as metadata, control commands, playlist information, and other relevant communication data.

In one embodiment, in which element 210 can, for example, correspond to an electronic processor device and element 230 can, for example, correspond to a media player device, element 210 can use coupling device 250 to transfer energy from its power supply to the media player device's supply, thereby charging the media player device power supply even while the media player device is in use. In certain embodiments in accordance with the disclosed subject matter, the media player device can continue media playback even after the electronic processor device is decoupled. This may be useful, for example, if a user's media player device power supply is running low on energy, and the user does not have a wall charger or other outlet-based charge source readily available to charge the media player. In these situations, the electronic processor device can act similar to a portable power supply, in addition to its other processing capabilities.

Figure 3:
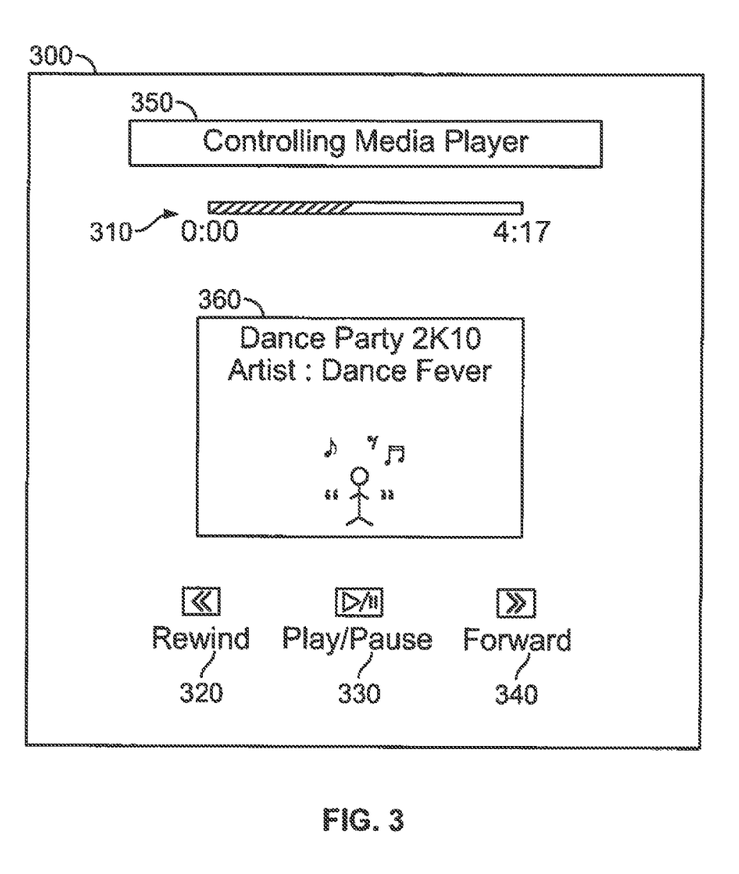
FIG. 3 is a schematic view of an illustrative user interface for controlling electronic media in accordance with one embodiment of the disclosed subject matter.

FIG. 3 is a schematic view of an illustrative user interface for controlling electronic media in accordance with one embodiment of the disclosed subject matter. User interface 300 may be displayed on the display of an electronic processor device similar to element 210 of FIG. 2. User interface 300 can include, among other things, a media time display 310, a rewind button 320, a play/pause button 330, a forward button 340 a status display banner 350 and a graphical display 360.

Several different interface options may be available in accordance with the disclosed subject matter. For example, in certain embodiments, the display can show an interface based on an application or applications native to (e.g., stored in memory of) the electronic processor device. In other embodiments, the processor device display can show an interface based on an application or applications native to (e.g., stored in memory of) an electronic media player similar to element 230 of FIG. 2. The electronic media player can send application data related to a native application stored on its memory, and the processor device can use this data to generate a user interface. Display data for the media player may be sent from the media player device to the processor device. The processor device may contain hardware and software configured to import the media player's native user interface and show the interface on its own device display. In other embodiments, the processor device may show an interface that is not native to either the processor device or the media player. As shown in status display banner 350, in these embodiments, the display may include an indicator letting a user know that the processing device is being used to control the media player. In certain embodiments, after the processor device and the media player device are coupled, the processor device may display a menu presenting interface options for the user to choose from. The user may choose from displays native to the processor device or media player, a preloaded non-native interface or in some embodiments, may generate a new custom user interface.

Figure 4:
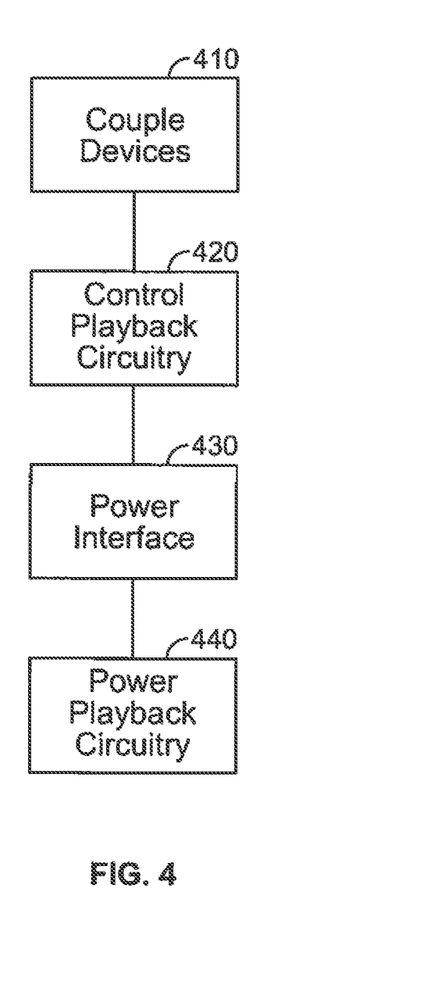
FIG. 4 is a flowchart of an illustrative process for coupling a first electronic device to a second electronic device and using the first electronic device to control playback circuitry on the second electronic device.

FIG. 4 is a flowchart of an illustrative process for coupling a first electronic device to a second electronic device and using the first electronic device to control playback circuitry on the second electronic device in accordance with one embodiment of the disclosed subject matter. In block 410, a first electronic device and a second electronic device are coupled. The first electronic device may be similar to electronic processor device 210 of FIG. 2. The second electronic device may be similar to media player device 230 of FIG. 2. The devices may be coupled using a connector similar to coupling device 250 in FIG. 2. Various types of coupling devices can be used to couple the two devices. For example, coupling can be performed using a USB cable, a firewire cable, or via audio input/output jacks. In certain embodiments, the devices may be coupled wirelessly. In block 420 after the two devices are coupled, the interface of the first electronic device can be used to control the playback circuitry of the second electronic device. In block 430, the interface is powered using the power supply of the first electronic device. In block 440, the playback circuitry is powered using power supply of the second electronic device.

Figure 5:
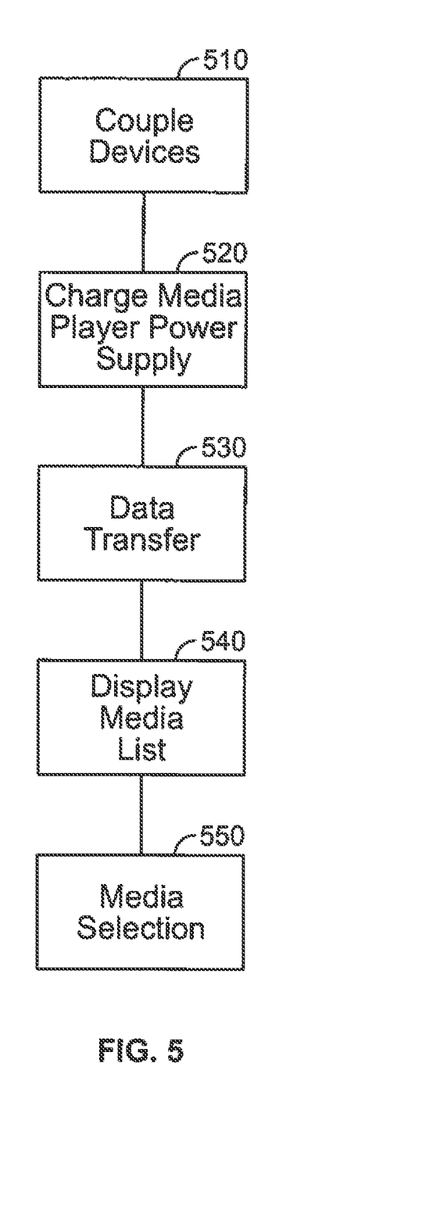
FIG. 5 is a flowchart of an illustrative process for coupling a first electronic device to a second electronic device and using the first electronic device to control media playback on the second electronic device in accordance with one embodiment of the disclosed subject matter.

FIG. 5 is a flowchart of an illustrative process for coupling a first electronic device to a second electronic device and using the first electronic device to control media playback on the second electronic device in accordance with one embodiment of the disclosed subject matter. In block 510, a first electronic device and a second electronic device are coupled. The first electronic device may be similar to electronic processor device 210 of FIG. 2. The second electronic device may be similar to media player device 230 of FIG. 2. The devices may be coupled using a connector similar to coupling device 250 in FIG. 2. Various types of coupling devices can be used to couple the two devices. For example, coupling can be performed using a USB cable, a firewire cable, or via audio input/output jacks. In certain embodiments, the devices may be coupled wirelessly. In block 520, after the two devices are coupled, the electronic processor device power supply begins charging the media player power supply via the coupling. Charging can continue even while the media player power supply is being used to supply power to media play circuitry for media playback or other applications using the media player device. In block 530, the two devices exchange data via their physical or wireless coupling. In an exemplary embodiment, the media player device sends metadata related to media files stored on the media player to the electronic processor device. The metadata sent from the media player device to the electronic processor device can be associated with media content using any suitable approach. For example, metadata can be stored as part of data that includes the content (e.g., metadata forms a header in a file). As another example, metadata can be stored in a separate location from the content. In particular, metadata can be stored in a metadata file (e.g., one file for each instance of content), a database (e.g., metadata database within an electronic device or within a particular application), remote location (e.g., a remote server), or any other suitable location. If the metadata is stored separately from the content, the metadata can be associated with the content using any suitable approach, including for example one or more references in the metadata and/or content, pointers, links, or other combinations of these.

In block 540 after receiving metadata, the electronic processor device can display a list of media stored on the media player device on its own user interface display. Depending on the embodiment and the received metadata, the electronic processor device can display a list of all the media stored on the media player device or can display only a certain subset of the stored media. In block 550, a subset of the displayed media is selected for playback on the media player device. Among other things, the user interface can also be used to forward through media, rewind media, pause media playback and adjust playback volume, create new media playlists or edit already existing media playlists.

The interface may also be used to shuffle media in a "random" order, set a single media item to repeat, or set a larger set of media to repeat after cycling through at least once. After a user makes the appropriate selection, the electronic processor device sends command data to the media player device, which then translates the command data and responds accordingly with its playback circuitry. Depending on user preferences, either the entire set or a smaller subset of the displayed media may be selected for playback on the media device. In certain embodiments in accordance with the disclosed subject matter, the media player device can continue playback even after the electronic processor device is decoupled.

Embodiments of the disclosed subject matter can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Although many of the embodiments of the presently disclosed subject matter are described herein with respect to personal computing devices, it should be understood that the presently disclosed subject matter is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill, in the art are defined to be within the scope of the defined elements.

The above described embodiments of the disclosed systems and methods are presented for purposes of illustration and not of limitation. Further, it should be noted that the language used in the specification has been principally selected for readability and instructional purposes, and may not have been selected to delineate or circumscribe the disclosed subject matter. Accordingly, the disclosure of the presently disclosed subject matter is intended to be illustrative, but not limiting, of the scope of the claimed subject matter, which is set forth in the following claims.

What is claimed is:

1. A method for operating an electronic device, the method comprising:
    detecting, by a first device, a two-way (bidirectional) coupling of the first device to a second device, wherein the first device comprises a first power supply, a memory, and a first input/output interface, and the second device comprises a second power supply, a second input/output interface, and a processing system;
    transmitting, by the first device to the processing system in the second device, metadata related to an application of the first device stored in the memory of the first device to allow the processing system to generate a user interface on the second input/output interface of the second device based, at least in part, on the metadata received from the first device; and
    receiving, by the first device, control commands from the second device to control output of electronic media from the first device, in response to user inputs received by the user interface of the second device.

2. The method of claim 1 further comprising:
    transmitting, by the first device to the second device, media metadata associated with media content stored on the first device, the electronic media comprising the media content which includes one or more of: audio recordings, images or video.

3. The method of claim 1 wherein the first input/output interface presents location information and the first input/output interface includes a touchpad.

4. The method of claim 1 further comprising using playback instructions sent from the second device to access media from the first device.

5. The method of claim 1 wherein the user interface comprises a user interface that is native to the first device.

6. The method of claim 1, the method further comprising:
recharging, by the second power supply, the first power supply.

7. The method of claim 6, wherein the first device is coupled to the second device by a wire.

8. The method of claim 1, wherein the first device is coupled to the second device by one of a wire or wireless communication.

9. The method of claim 1, wherein the first power supply is configured to be charged by the second power supply.

10. The method of claim 9, wherein the second power supply is larger than the first power supply and wherein the first device includes a media player and the memory stores subscription information and wireless connection information and wherein the second device acts as a portable power supply for the first device.

11. A non-transitory machine readable medium storing executable program instructions which when executed by a data processing system cause the data processing system to perform a method for operating an electronic device, the method comprising:
detecting, by a first device, a two-way (bidirectional) coupling of the first device to a second device, wherein the first device comprises a first power supply, a memory, and a first input/output interface, and the second device comprises a second power supply, a second input/output interface, and a processing system;
transmitting, by the first device to the processing system in the second device, metadata related to an application of the first device stored in the memory of the first device to allow the processing system to generate a user interface on the second input/output interface of the second device based, at least in part, on the metadata received from the first device; and
receiving, by the first device, control commands from the second device to control output of electronic media from the first device, in response to user inputs received by the user interface of the second device.

12. The medium of claim 11, the method further comprising:
transmitting, by the first device to the second device, media metadata associated with media content stored on the first device, the electronic media comprising the media content which includes one or more of: audio recordings, images or video.

13. The medium of claim 11 wherein the first input/output interface presents location information and the first input/output interface includes a touchpad.

14. The medium of claim 11, the method further comprising using playback instructions sent from the second device to access media from the first device.

15. The medium of claim 11 wherein the user interface comprises a user interface that is native to the first device.

16. The medium of claim 11, the method further comprising:
recharging, by the second power supply, the first power supply.

17. The medium of claim 16, wherein the first device is coupled to the second device by a wire.

18. The medium of claim 11, wherein the first device is coupled to the second device by one of a wire or wireless communication.

19. The medium of claim 11, wherein the first power supply is configured to be charged by the second power supply.

20. The medium of claim 19, wherein the second power supply is larger than the first power supply and wherein the first device includes a media player and the memory stores subscription information and wireless connection information and wherein the second device acts as a portable power supply for the first device.

21. A non-transitory machine readable medium storing executable program instructions which when executed by a data processing system cause the data processing system to perform a method for operating an electronic device, the method comprising:
detecting, by a first device, a two-way (bidirectional) coupling of the first device to a second device, wherein the first device comprises a first power supply, a memory, and a first input/output interface, and the second device comprises a second power supply, a second input/output interface, and a processing system;
transmitting, by the first device to the processing system in the second device, metadata related to an application of the first device stored in the memory of the first device to allow the processing system to generate a user interface on the second input/output interface of the second device based, at least in part, on the metadata received from the first device; and
receiving, by the first device, control commands from the second device to control output of content from the first device, in response to user inputs received by the user interface of the second device.

22. The medium of claim 21, the method further comprising:
transmitting, by the first device to the second device, media metadata associated with media content stored on the first device, the content comprising the media content which includes one or more of: audio recordings, images or video.

23. The medium of claim 21 wherein the first input/output interface presents location information and the first input/output interface includes a touchpad.

24. The medium of claim 21, the method further comprising using playback instructions sent from the second device to access content media from the first device.

25. The medium of claim 21 wherein the user interface of the second device comprises a user interface that is native to the first device.

26. The medium of claim 21, the method further comprising:
recharging, by the second power supply, the first power supply.

27. The medium of claim 26, wherein the first device is coupled to the second device by a wire.

28. The medium of claim 21, wherein the first device is coupled to the second device by one of a wire or wireless communication.

29. The medium of claim 21, wherein the first power supply is configured to be charged by the second power supply.

30. The medium of claim 29, wherein the second power supply is larger than the first power supply and wherein the first device includes a media player and the memory stores wireless connection information and wherein the second device acts as a portable power supply for the first device.

31. A first device comprising:
   a first power supply;
   a memory;
   a first processing system coupled to the first power supply and coupled to the memory, wherein the memory includes a non-transitory machine readable medium storing executable program instructions which when executed by the first processing system cause the first processing system to perform a method for operating the first device, the method comprising:
   detecting, by the first device, a two-way (bidirectional) coupling of the first device to a second device, wherein the second device comprises a second power supply, a second input/output interface, and a second processing system;
   transmitting, by the first device to the second processing system in the second device, metadata related to an application of the first device stored in the memory of the first device to allow the second processing system to generate a user interface on the second input/output interface of the second device based, at least in part, on the metadata received from the first device; and
   receiving, by the first device, control commands from the second device to control output of content from the first device, in response to user inputs received by the user interface of the second device.

32. The first device of claim 31, wherein the method further comprises:
   transmitting, by the first device to the second device, media metadata associated with media content stored on the first device, the content comprising the media content which includes one or more of: audio recordings, images or video.

33. The first device of claim 31 wherein the first input/output interface presents location information and the first input/output interface includes a touchpad.

34. The first device of claim 31, wherein the method further comprises using playback instructions sent from the second device to access content media from the first device.

35. The first device of claim 31 wherein the user interface of the second device comprises a user interface that is native to the first device.

36. The first device of claim 31, wherein the method further comprises:
   recharging, by the second power supply, the first power supply.

37. The first device of claim 36, wherein the first device is coupled to the second device by a wire.

38. The first device of claim 31, wherein the first device is coupled to the second device by one of a wire or wireless communication.

39. The first device of claim 31, wherein the first power supply is configured to be charged by the second power supply.

40. The first device of claim 39, wherein the second power supply is larger than the first power supply and wherein the first device includes a media player and the memory stores wireless connection information and wherein the second device acts as a portable power supply for the first device.

* * * * *